United States Patent
Seong et al.

(10) Patent No.: US 11,899,310 B2
(45) Date of Patent: Feb. 13, 2024

(54) DISPLAY DEVICE

(71) Applicant: LG ELECTRONICS INC., Seoul (KR)

(72) Inventors: Soowang Seong, Seoul (KR); Seungwoong Moon, Seoul (KR); Juyoung Joung, Seoul (KR); Woongjoon Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/772,277

(22) PCT Filed: Oct. 28, 2019

(86) PCT No.: PCT/KR2019/014239
§ 371 (c)(1),
(2) Date: Apr. 27, 2022

(87) PCT Pub. No.: WO2021/085657
PCT Pub. Date: May 6, 2021

(65) Prior Publication Data
US 2022/0373842 A1    Nov. 24, 2022

(51) Int. Cl.
*G02F 1/13357* (2006.01)
*G02F 1/1333* (2006.01)

(52) U.S. Cl.
CPC .. *G02F 1/133606* (2013.01); *G02F 1/133314* (2021.01); *G02F 2201/08* (2013.01); *G02F 2202/28* (2013.01)

(58) Field of Classification Search
CPC .......... G02F 1/1333–133322; G02F 1/133606; G02F 2201/08; G02F 2201/508; G02F 2202/28
See application file for complete search history.

(56) References Cited

U.S. PATENT DOCUMENTS

| | | | | |
|---|---|---|---|---|
| 8,876,358 | B2 * | 11/2014 | Park | G02F 1/133308 |
| | | | | 362/633 |
| 9,304,344 | B2 * | 4/2016 | Lee | G02F 1/133308 |
| 2018/0143488 | A1 | 5/2018 | Park et al. | |

FOREIGN PATENT DOCUMENTS

| | | |
|---|---|---|
| EP | 2640040 A1 | 9/2013 |
| KR | 10-2008-0045802 A | 5/2008 |
| KR | 10-2013-0122884 A | 11/2013 |
| KR | 10-2014-0112994 A | 9/2014 |
| KR | 10-2014-0128151 A | 11/2014 |
| KR | 10-2016-0012786 A | 2/2016 |
| KR | 10-2016-0065232 A | 6/2016 |
| KR | 10-2016-0080824 A | 7/2016 |
| KR | 10-2018-0007041 A | 1/2018 |

(Continued)

*Primary Examiner* — Jason M Han
(74) *Attorney, Agent, or Firm* — Birch, Stewart, Kolasch & Birch, LLP

(57) ABSTRACT

A display device according to the present invention comprises: a display panel; a middle cabinet for mounting the display panel; and a foam pad which is interposed between the display panel and the middle cabinet, and has a light absorbing material formed in either an area having a contact surface with the display panel or a contact surface with the middle cabinet. The display device of the present invention may be connected to an artificial intelligence module, a robot, an augmented reality (AR) device, a virtual reality (VR) device, a device related to a 5G service, etc.

9 Claims, 5 Drawing Sheets

(56) References Cited

FOREIGN PATENT DOCUMENTS

| KR | 10-2018-0057942 A | 5/2018 |
|----|-------------------|--------|
| KR | 10-2019-0068779 A | 6/2019 |

\* cited by examiner

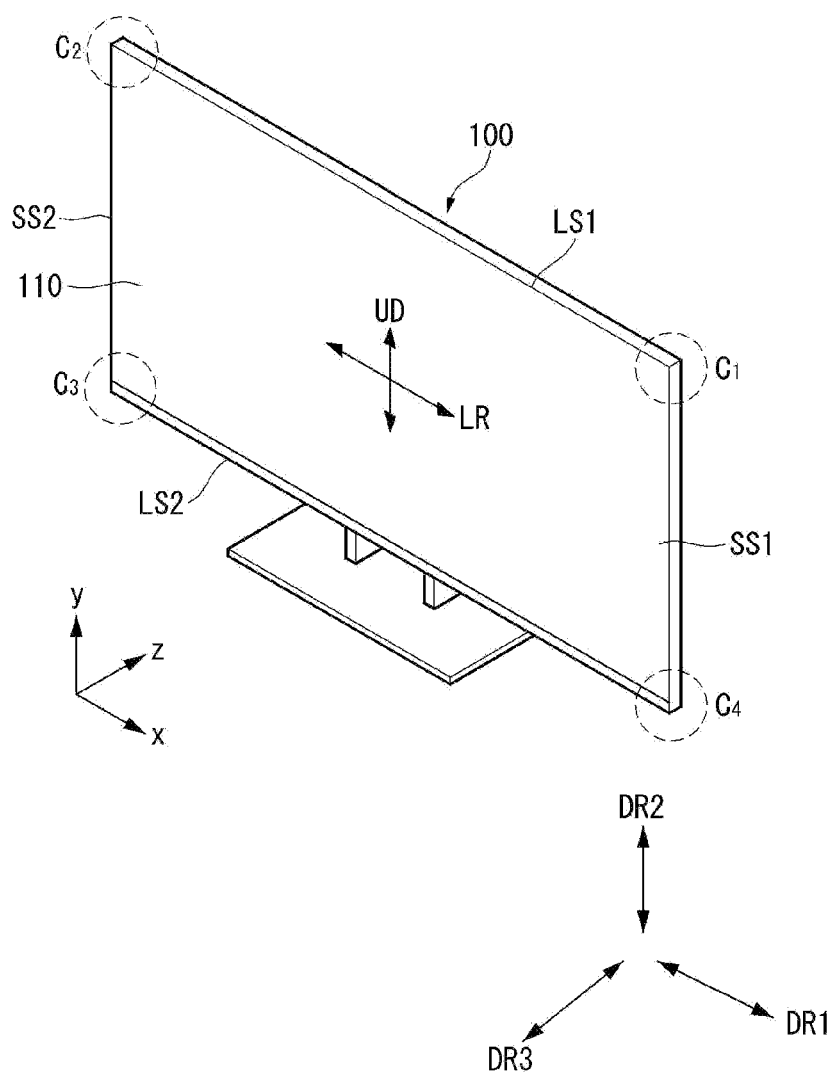
[FIG. 1]

[FIG. 2]
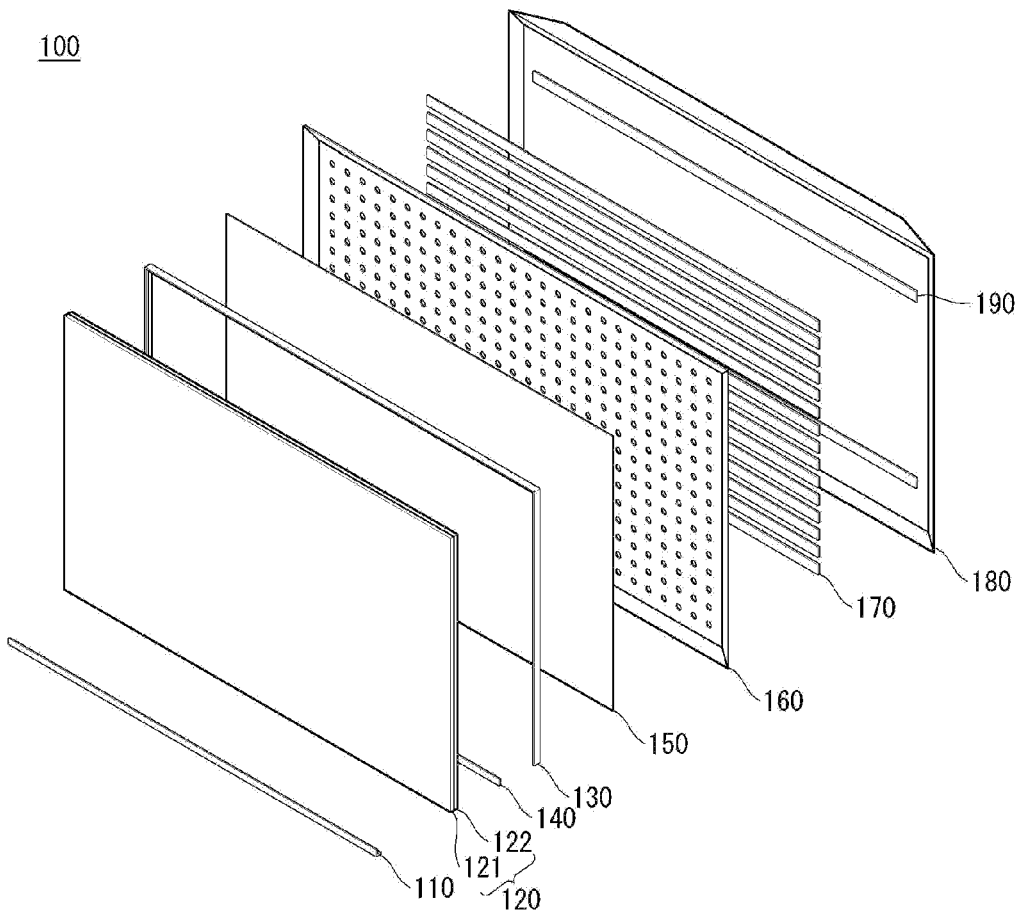
[FIG. 3]
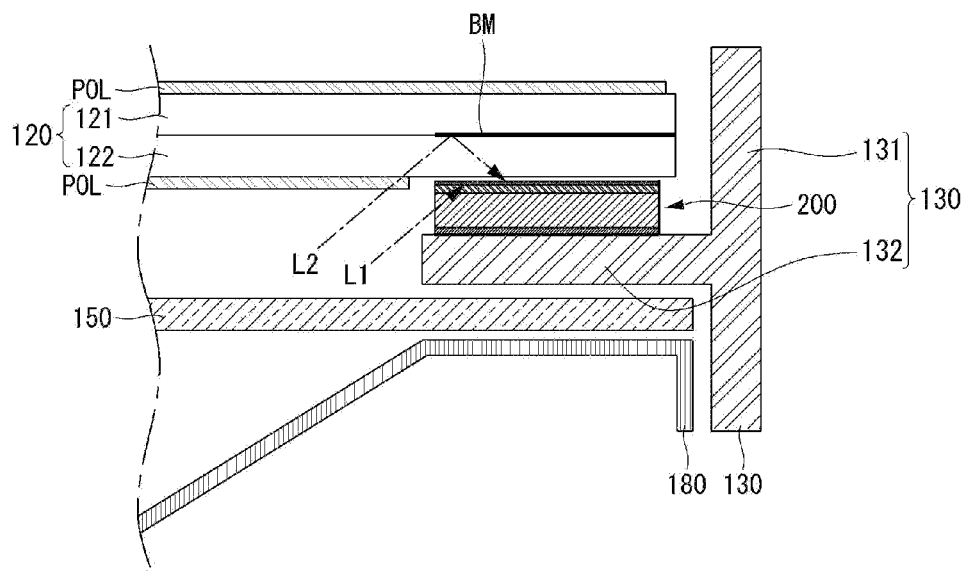

【FIG. 4】
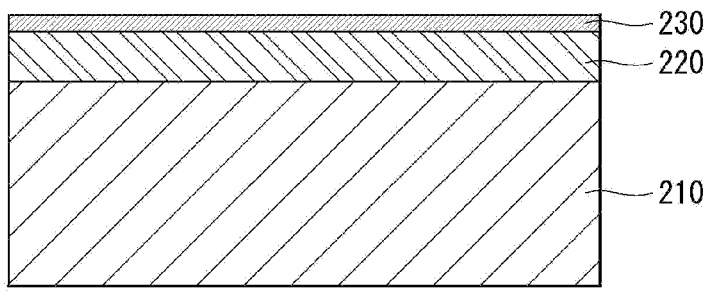
【FIG. 5】
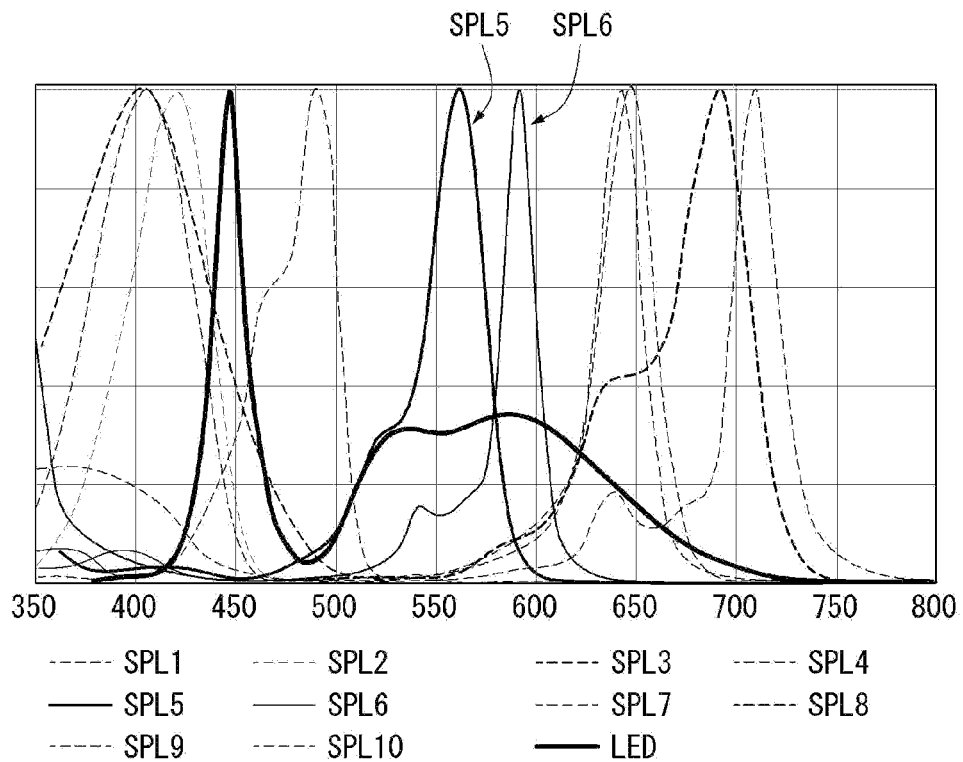

[FIG. 6]
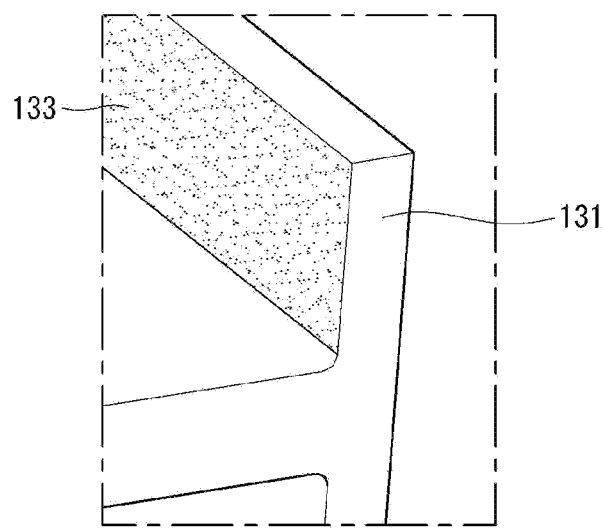
[FIG. 7]
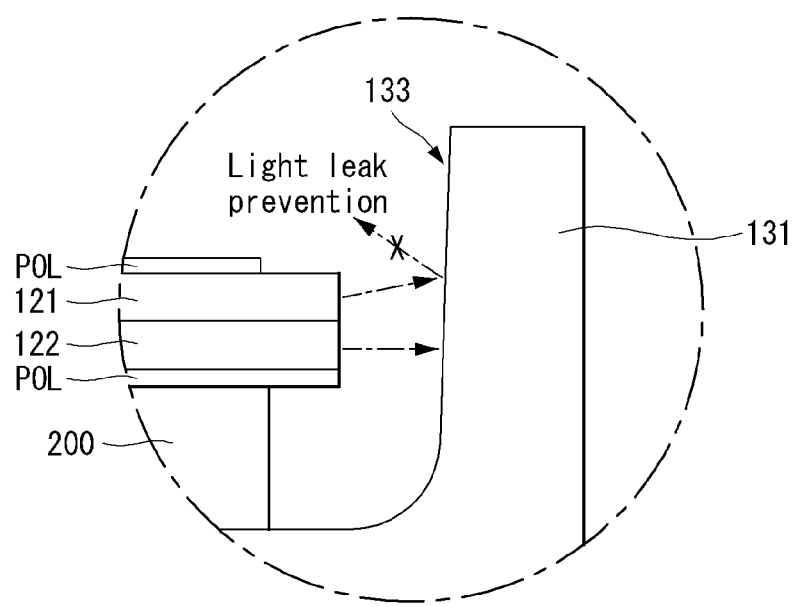

[FIG. 8]
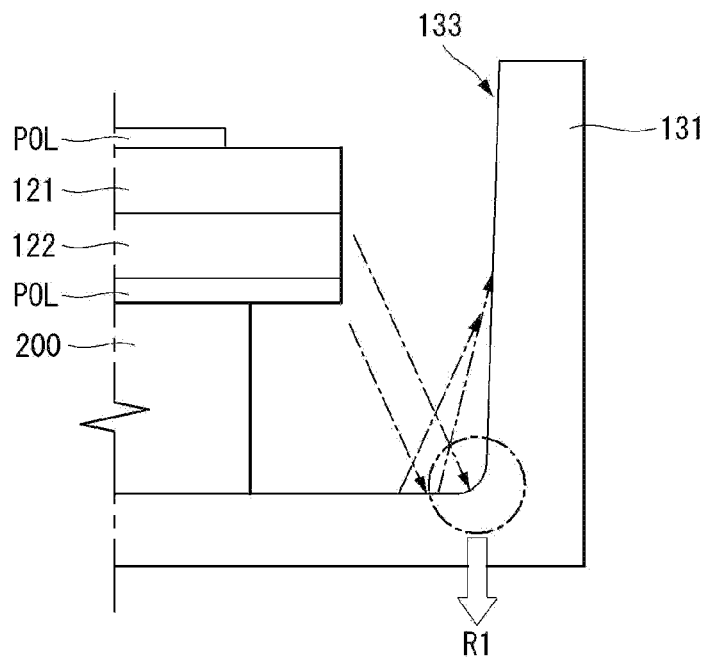
[FIG. 9]
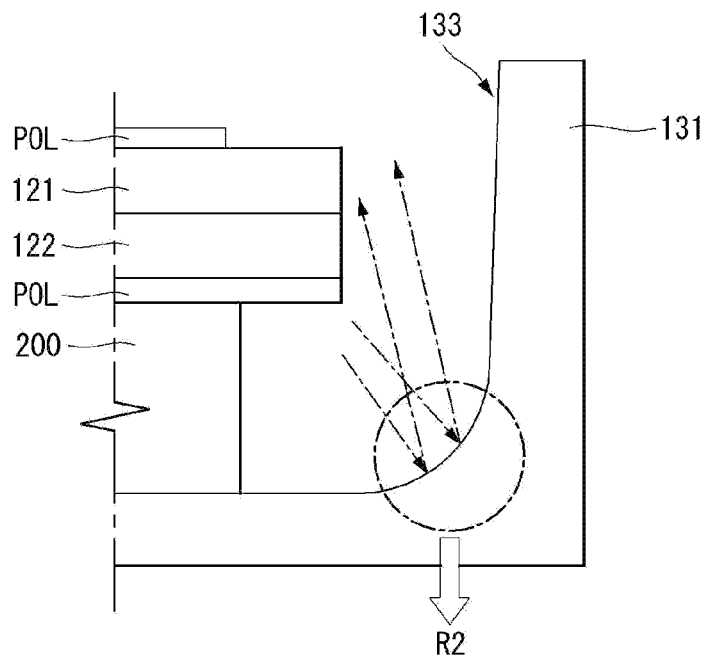

DISPLAY DEVICE

CROSS REFERENCE TO RELATED APPLICATIONS

This application is the National Phase of PCT/KR2019/014239 filed on Oct. 28, 2019, which is hereby expressly incorporated by reference into the present application.

TECHNICAL FIELD

The present disclosure relates to a display device, and particularly, to a display device capable of improving light leakage in an edge area of a display panel.

BACKGROUND ART

As the information society develops, the demand for display devices is also increasing in various forms, and in response to this, in recent years, various flat panel display devices such as a liquid crystal display device (LCD), and an organic light emitting diode (OLED) have been developed.

Among them, the liquid crystal display device includes a liquid crystal panel in which a liquid crystal layer is aligned and a backlight unit that irradiates light to the liquid crystal panel, and expresses the gray scale of a pixel based on the fact that the degree of deflection of the liquid crystal varies based on an electric field.

In the liquid crystal display device, a light leakage phenomenon, in which light from the backlight unit is exposed from a gap in a device other than the liquid crystal panel, may occur, and this light leakage phenomenon gives a visual inconvenience to the user.

DETAILED DESCRIPTION OF INVENTION

Technical Problem

An object of the present disclosure is to provide a display device capable of improving light leakage in an edge area of the display device in order to satisfy the above needs.

In particular, an object of the present disclosure is to provide a display device capable of improving the occurrence of light leakage in an edge area of the display device through a simplified process.

Technical Solution

A display device according to the present disclosure comprises a display panel, a middle cabinet for seating the display panel, and a foam pad interposed between the display panel and the middle cabinet, and in which a light absorbing material is formed on any one of a contact surface with the display panel or a contact surface with the middle cabinet.

The foam pad may include an adhesive layer bonded to the display panel, and the light absorbing material may be added to the adhesive layer.

The light absorbing material may absorb at least one of green and orange lights having high visibility.

The middle cabinet may include a seating portion on which the foam pad is seated and a side wall that is bent and extended from the seating portion, and an inner surface of the side wall in contact with a side surface of the display panel may be a matte surface.

A corrosion treatment process may be performed on the inner surface of the middle cabinet.

A corrosion roughness of the inner surface of the middle cabinet may be 2 µm to 5 µm.

A curved surface of an area where the inner surface of the middle cabinet meets the seating portion may have a radius of curvature of 0.3R or less.

The inner surface of the middle cabinet may directly face the side surface of the display panel.

All areas of a front surface of the display panel may be exposed outside.

The display device may further comprise a backlight unit irradiating light to the display panel, an optical sheet guiding a light path irradiated by the backlight unit, and a cover bottom mounting the backlight unit and fastened to the middle cabinet or the optical sheet.

Advantageous Effects

According to an embodiment of the present disclosure, by absorbing the light reaching the adhesive layer of the foam pad, it is possible to improve the leakage of light passing through the foam pad.

In addition, according to an embodiment of the present disclosure, it is possible to improve light reflected from the inner surface of the middle cabinet from leaking to the outside.

In addition, according to an embodiment of the present disclosure, it is possible to improve light reflected from the inner curved surface of the middle cabinet from leaking to the outside.

According to an embodiment of the present disclosure, since light leakage from the edge area of the display panel can be improved, an additional accessory covering the edge area of the display panel and a process for forming the same can be omitted.

DESCRIPTION OF DRAWINGS

FIG. 1 is a view showing a display device according to an embodiment of the present disclosure.

FIG. 2 is an exploded perspective view of a display device according to an embodiment of the present disclosure.

FIG. 3 is a cross-sectional view of a display device according to an embodiment of the present disclosure.

FIG. 4 is a view showing a cross-section of a foam pad.

FIG. 5 is a view showing a wavelength area of visible light absorbing material.

FIGS. 6 and 7 are views illustrating an embodiment of a matte treatment on an inner surface of a middle cabinet.

FIGS. 8 and 9 are views illustrating an embodiment of an inner radius of curvature of a middle cabinet.

MODE FOR INVENTION

Hereinafter, embodiments disclosed in the present disclosure are described in detail with reference to the accompanying drawings. The same or similar reference numerals are assigned to the same or similar elements regardless of their reference numerals, and redundant descriptions thereof are omitted.

In the following description, although embodiments are described with reference to specific drawings, if necessary, reference numerals not appearing in the specific drawings may be referred to, and reference numbers not appearing in the specific drawings are used only when the reference numbers appear in the remaining drawings.

It may be used terms such as first, second, A, B, (a), (b), upper side, lower side used in the following description.

These terms are only for distinguishing the elements from other elements, and the essence, order, or sequence of the elements, etc. is not limited by the terms.

The suffixes "module" and "part" for elements used in the following description are given or used interchangeably in consideration of only the ease of writing the specification, and do not have distinct meanings or roles by themselves.

In the following description, when it is described that a first element is 'connected', 'coupled', 'mounted', 'fastened', 'contacted' or 'accessed' to a second element, it is included a case in which a third element is 'connected', 'coupled', 'mounted', 'fastened', 'contacted' or 'accessed' between the first element and the second element, as well as a case in which the first element is directly 'connected', 'coupled', 'mounted', 'fastened', 'contacted' or 'accessed' to the second element.

In the following description, when it is determined that the detailed description of the related art is likely to blur the gist of the embodiment in the present disclosure, a detailed description thereof may be omitted.

In the following description, the accompanying drawings are only for the purpose of easily understanding the embodiments disclosed in the present disclosure, and the technical spirit disclosed in the present disclosure is not limited by the accompanying drawings, it should be understood that the present disclosure include all modifications, equivalents and substitutes included within the spirit and technical scope of the present disclosure.

Terms such as height, length, width, and breadth used in the following description may be used interchangeably for convenience of description, and do not have distinct meanings or roles by themselves.

Hereinafter, a liquid crystal display device (LCD) will be described as an example for a display panel, but the display panel applicable to the present disclosure is not limited to the LCD panel.

FIG. 1 is a perspective view showing a display device according to an embodiment of the present disclosure.

Referring to FIG. 1, hereinafter, a display device 100 according to the present disclosure may include a first long side LS1, a second long side LS2 opposite the first long side LS1, a first short side SS1 adjacent to the first long side LS1 and the second long side LS2, and a second short side SS2 opposite the first short side SS1.

Here, it is possible that the first short side area SS1 is referred to as a first side area, the second short side area SS2 is referred to as a second side area opposite the first side area, the first long side area LS1 is referred to as a third side area adjacent to the first side area and the second side area and positioned between the first side area and the second side area, and the second long side area LS2 is referred to as a fourth side area adjacent to the first side area and the second side area and positioned between the first side area and the second side area and opposite the third side area.

In addition, for convenience of description, although lengths of the first and second long sides LS1 and LS2 are longer than lengths of the first and second short sides SS1 and SS2, the length of each of the first and second long sides LS1 and LS2 may be the same as the length of each of the first and second short sides SS1 and SS2.

In addition, hereinafter, a first direction DR1 may be a direction parallel to the long sides LS1 and LS2 of a display panel 110, and a second direction DR2 may be a direction parallel to the short sides SS1 and SS2 of the display panel 110. A third direction DR3 may be a direction perpendicular to the first direction DR1 and the second direction DR2.

Assuming that the display surface of the display device 100 is a horizontal plane, the first direction DR1 and the second direction DR2 may be collectively referred to as a horizontal direction. Accordingly, the third direction DR3 may be referred to as a vertical direction.

A direction in which the display device 100 displays an image may be referred to as a forward direction or a front side or front surface. When the display device displays the image, a direction in which the image cannot be observed may be referred to as a rearward direction or a rear side or a rear surface. When the display device 100 is viewed from the front direction or the front surface, the first long side LS1 side may be referred to as an upper side or an upper surface. Similarly, the second long side LS2 side may be referred to as a lower side or a lower surface. Similarly, the first short side SS1 side may be referred to as a right side or right surface, and the second short side SS2 side may be referred to as a left side or a left surface.

In addition, the first long side LS1, the second long side LS2, the first short side SS1, and the second short side SS2 may be referred to as edges of the display device 100. In addition, a point at which the first long side LS1, the second long side LS2, the first short side SS1, and the second short side SS2 meet each other may be referred to as corners. For example, a point where the first long side LS1 meets the first short side SS1 may be a first corner C1, a point where the first long side LS1 meets the second short side SS2 may be a second corner C2, a point where the second short side SS2 meets the second long side LS2 may be a third corner C3, and a point where the second long side LS2 meets the first short side SS1 may be a fourth corner C4.

Here, a direction from the first short side SS1 to the second short side SS1 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

FIG. 2 is an exploded perspective view of a display device.

Referring to FIG. 2, the display device according to an embodiment of the present disclosure includes a case top down assembly 110, a display panel 120, a middle cabinet 130, a guide panel down assembly 140, an optical sheet 150, a reflective plate 160, a backlight unit 170, a cover bottom 180, and a reinforcement bar 190.

The case top down assembly 110 is fastened at the lower portion of the display panel 120, and covers a portion of the second long side LS2 side on the lower surface and the upper surface of the display panel 120. The case top down assembly 110 may also be fastened to the cover bottom 180.

The display panel 120 is provided on the front of the display device 100 and may display an image. The display panel 120 includes pixels including sub-pixels of R (red), G (green), B (blue) or R (red), G (green), B (blue), and W (white), and displays a color image by adjusting the gray scale of the sub-pixels. The display panel 110 may be divided into an active area in which an image is displayed and a de-active area in which an image is not displayed. The display panel 120 may include a front substrate 121 and a rear substrate 122 facing each other with a liquid crystal layer interposed therebetween.

The display panel 120 may include a black matrix BM interposed between the front substrate ( ) and the rear substrate ( ) in the edge area.

A polarizing plate POL may be formed on at least one of the front and rear surfaces of the display panel 120.

The front substrate 121 may have a color filter formed thereon, and may include pixels including R, G, B or R, G, B, and W sub-pixels.

The rear substrate 122 may include switching elements. The rear substrate may switch a pixel electrode. For example, the pixel electrode may change the molecular arrangement of the liquid crystal layer based on a control signal applied from the outside.

The liquid crystal layer may include liquid crystal molecules. The arrangement of the liquid crystal molecules may be changed based on a voltage difference generated between the pixel electrode and the common electrode. The liquid crystal layer may transmit or block light provided from the backlight unit 170 to the front substrate.

The middle cabinet 130 supports the side area of the display panel 120. In cross-section, the middle cabinet 130 has a structure for seating the end of the display panel 120. The middle cabinet 130 may be formed to surround two or more side surfaces of the display panel 120. In the present disclosure, the middle cabinet 130 has a shape surrounding three side surfaces of the display panel, for example, an upper side, a left side, and a right side. The middle cabinet 130 may be bonded to the rear substrate 122 of the display panel 120 through a foam pad 200.

The guide panel down assembly 140 surrounds an area not covered by the middle cabinet 130. For example, when the middle cabinet 130 covers the first long side LS1 and the first and second short sides SS1 and SS2 of the display panel 120, the guide panel down assembly 140 may cover the area of the second long side LS2 of the display panel 120.

The optical sheet 150 may allow the light of the light source to be uniformly transmitted to the display panel 120. The optical sheet 150 may be composed of a layer composed of a plurality of sheets. For example, the optical sheet 150 may include a prism sheet, a diffusion sheet, or the like. The optical sheet 150 may be disposed between the cover bottom 180 and the middle cabinet.

The reflective plate 160 is to increase the efficiency of the light irradiated from the backlight unit 170, and may be made of a material having high reflectivity. A hole for transmitting light from the backlight unit 170 may be formed in the reflective plate 160.

The backlight unit 170 is positioned at the rear of the display panel 120 and irradiates light toward the display panel 120. The backlight unit 170 includes a light source for emitting light, and the light source may include a plurality of LEDs. The backlight unit 120 may be driven by a full driving method or a partial driving method such as local dimming or impulsive driving.

The cover bottom 180 supports the components of the display device 100, and provides a space for mounting the backlight unit 170. The cover bottom 180 may be coupled to the optical sheet 150 and/or the middle cabinet 130. The reinforcement bar 190 for reinforcing rigidity may be coupled to the cover bottom 180.

Also, a heat sink (not shown) for dissipating heat to the outside may be formed between the cover bottom 180 and the backlight unit 170.

FIG. 3 is a cross-sectional view of a display device, and FIG. 4 is a view showing a cross-section of a foam pad.

Referring to FIGS. 3 and 4, the middle cabinet 130 includes a side wall 131 and a seating portion 132, and the display panel 120 is mounted on the seating portion 132 of the middle cabinet 130. An end of the cover bottom 180 may have a curved shape to correspond to a lower surface of the seating portion 132 of the middle cabinet 130 and one surface of the side wall 131. In the present disclosure, an upper surface of the seating portion 132 refers to a surface facing the display panel 120, and the lower surface refers to a rear surface of the upper surface. The optical sheet 150 may be disposed between the cover bottom 180 and the seating portion 132 of the middle cabinet 130.

The foam pad 200 is interposed between the display panel 120 and the middle cabinet 130, and keeps a constant distance between the display panel 120 and the optical sheet 150. The foam pad 200 includes a light absorbing material in any one of a contact surface with the display panel 120 or a contact surface with the middle cabinet 130. In the present disclosure, the foam pad 200 illustrates an embodiment in which the light absorbing material is formed on the contact surface with the display panel 120.

The foam pad 200 includes a urethane layer 210, a skin layer 220, and an adhesive layer 230. The urethane layer 210 and the skin layer 220 are made of polyurethane, and may be distinguished by a difference in density. The adhesive layer 230 is in contact with the display panel 120, and bonds the display panel 120 together.

The adhesive layer 230 includes a light absorbing material. The light absorbing material absorbs light, and particularly absorbs visible light of high visibility colors such as green or orange. Due to the light absorbing material, light reaching the adhesive layer 230 of the foam pad 200 may be absorbed. For example, like a first path L1, light directly reaching the adhesive layer 230 via the foam pad 200 is absorbed by the light absorbing material. In addition, like a second path L2, light reflected within the lower substrate 122 and reaching the adhesive layer 230 of the foam pad 200 is absorbed by the light absorbing material.

As described above, it is possible to improve a phenomenon in which light reaching the foam pad 200 leaks to the outside based on the light absorbing material included in the adhesive layer 230 of the foam pad 200. In particular, in the present disclosure, since the light absorbing material is added to the adhesive layer 230, a process of bonding an additional film or tape for light reflection is not required. That is, the light leakage phenomenon can be improved based on a simplified process and configuration.

FIG. 5 is a view showing a wavelength area of visible light absorbed based on a type of light absorbing material.

Referring to FIG. 5, first to tenth samples SPL1 to SPL10 refer to light absorbing materials absorbing visible light of different wavelengths, respectively. Among them, the first sample SPL1 absorbs a green wavelength, and the second sample SPL2 absorbs an orange wavelength. The adhesive layer of the foam pad 200 may include at least one light absorbing material among the first sample SPL1 and the second sample SPL2 to absorb at least one wavelength from among the green and orange wavelengths with high visibility.

FIGS. 6 and 7 are views illustrating a perspective view and a cross-sectional view of a middle cabinet.

Referring to FIGS. 6 and 7, an inner surface 133 of the middle cabinet 130 is surface-treated with a matte surface. For example, the inner surface 133 of the middle cabinet 130 may be with corrosion treatment. The inner surface 133 refers to a surface in contact with the side surface of the display panel 120 on the side wall 131. Through a corrosion treatment process through a mechanical process or a chemical process, the inner surface 133 is rough and has a matte characteristic. The corrosion treatment process may be performed on the inner surface 133 of the middle cabinet 130 to have a roughness of 2 μm to 5 μm.

The inner surface 133 of the middle cabinet 130 may improve reflection of light leaking from the side surface of the display panel 120 through the corrosion treatment process. That is, according to the present disclosure, it is possible to improve a phenomenon in which light from the side surface of the display panel 120 is reflected from the inner surface 133 of the middle cabinet 130 and leaks to the outside of the display device.

In particular, since the inner surface 133 of the middle cabinet 130 is given roughness through the corrosion treatment process and has a matte characteristic, there is no need to additionally bond a film or the like having a matte characteristic. Due to the slimming of the display device, a height of the side wall 131 of the middle cabinet 130 is gradually lowered, and accordingly, it is difficult to bond the matte film, etc. to the inner surface 133 of the middle cabinet 130.

In contrast, the present disclosure can improve light leakage from the side surface of the display panel 120 without requiring a process for bonding the matte film, etc.

In addition, since the present disclosure can prevent light reflection from the inner surface 133 of the middle cabinet 130, there may be more freedom in the side surface processing of the display panel 120. When light reflection from the inner surface 133 of the middle cabinet 130 is concerned, the side surface of the display panel 120 needs to undergo a sealing process to prevent light leakage. In contrast, in the present disclosure, since light reflection from the inner surface 133 of the middle cabinet 130 can be prevented, the side surface treatment process of the display panel 120 can be omitted, so that the overall display device process can be reduced.

FIGS. 8 and 9 are views illustrating an inner curvature range of a middle cabinet.

Referring to FIGS. 8 and 9, a inner radius of curvature of the middle cabinet 130 refers to a distance between a curved surface formed at the point where the inner surface 133 and the upper surface of the seating portion 132 meet and a center of the curved surface. The upper surface of the seating portion 132 is in contact with the foam pad 200, and refers to a surface facing the display panel 120.

The light leaking from the side surface of the display panel 120 may be reflected from a curved surface at a point where the inner surface 133 and the seating portion 132 meet in addition to the inner surface 133 of the middle cabinet 130.

As shown in FIG. 8, when the inner radius of curvature of the middle cabinet 130 is 0.3R, light reflected from the inner curved surface of the middle cabinet 130 is often reflected to the inner surface 133 or reflected in the direction of the foam pad. As described above, since the inner surface 133 of the middle cabinet 130 is matte, the light directed to the middle cabinet 130 is not reflected and does not leak to the outside.

In contrast, as shown in FIG. 9, when the inner radius of curvature of the middle cabinet 130 is 1.0R, the light reflected from the inner curved surface of the middle cabinet 130 may leak to the outside through a gap between the display panel 120 and the inner surface 133.

Accordingly, the middle cabinet 130 of the present disclosure may have a small inner radius of curvature, and may be set to a radius of curvature of 0.3R or less as in the embodiment.

As described above, according to the embodiment of the present disclosure, it is possible to minimize light leakage through a gap between the display panel 120 and the sidewall 131 of the middle cabinet 130. Accordingly, it is possible to improve the occurrence of light leakage in the edge area of the display panel 120 even if a case covering the edge area of the display panel 120 is not added. Accordingly, since the case covering the edge area of the display panel 120 is not required, the display device 100 of the present disclosure can expose all areas of the front surface of the display panel 120 to the outside. Accordingly, it is possible to provide a display device having a large display screen compared to the same size while minimizing the bezel area related to the non-display area of the display panel 120.

Certain embodiments or other embodiments of the present disclosure described above are not mutually exclusive or distinct from each other. The certain embodiments or other embodiments of the present disclosure described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

The above detailed description should not be construed as restrictive in all respects and should be considered as exemplary. The scope of the present disclosure should be determined by a reasonable interpretation of the appended claims, and all modifications within the equivalent scope of the present disclosure are included within the scope of the present disclosure.

The invention claimed is:

1. A display device comprising:
   a display panel;
   a middle cabinet for seating the display panel; and
   a foam pad interposed between the display panel and the middle cabinet, and in which a light absorbing material is formed on any one of a contact surface with the display panel or a contact surface with the middle cabinet,
   wherein the middle cabinet comprises:
   a seating portion on which the foam pad is seated; and
   a side wall bent from the seating portion, and having an inner surface facing a side surface of the display panel, and
   wherein a curved surface of an area where the inner surface of the side wall meets the seating portion has a radius of curvature of 0.3R or less.

2. The display device of claim 1, wherein the foam pad includes an adhesive layer bonded to the display panel, and the light absorbing material is added to the adhesive layer.

3. The display device of claim 1, wherein the light absorbing material absorbs at least one of green and orange lights having high visibility.

4. The display device of claim 1,
   wherein the inner surface of the side wall is a matte surface.

5. The display device of claim 4, wherein a corrosion treatment process is performed on the inner surface of the middle cabinet.

6. The display device of claim 5, wherein a corrosion roughness of the inner surface of the middle cabinet is 2 μm to 5 μm.

7. The display device of claim 4, wherein the inner surface of the middle cabinet directly faces the side surface of the display panel.

8. The display device of claim 1, wherein all areas of a front surface of the display panel are exposed outside.

9. The display device of claim 1, further comprising:
   a backlight unit irradiating light to the display panel;

an optical sheet guiding a light path irradiated by the backlight unit; and a cover bottom mounting the backlight unit and fastened to the middle cabinet or the optical sheet.

\* \* \* \* \*